(12) United States Patent
Pean et al.

(10) Patent No.: US 8,726,037 B2
(45) Date of Patent: May 13, 2014

(54) ENCRYPTED MEMORY ACCESS

(75) Inventors: Guillaume Pean, Aix en Provence (FR);
Alain Vergnes, Trets (FR); Michel Douguet, Marseilles (FR)

(73) Assignee: Atmel Corporation, San Jose, CA (US)

( * ) Notice: Subject to any disclaimer, the term of this patent is extended or adjusted under 35 U.S.C. 154(b) by 253 days.

(21) Appl. No.: 13/246,752

(22) Filed: Sep. 27, 2011

(65) Prior Publication Data
US 2013/0080790 A1    Mar. 28, 2013

(51) Int. Cl.
*G06F 21/00* (2013.01)
*G06F 12/14* (2006.01)
*G06F 21/60* (2013.01)

(52) U.S. Cl.
CPC ............ *G06F 12/1408* (2013.01); *G06F 12/14* (2013.01); *G06F 21/60* (2013.01)
USPC ............................. 713/189; 713/190; 713/194

(58) Field of Classification Search
CPC ...... G06F 12/1408; G06F 12/14; G06F 21/60
USPC .......................................... 713/189, 190, 194
See application file for complete search history.

(56) References Cited

U.S. PATENT DOCUMENTS

| | | | |
|---|---|---|---|
| 5,199,074 A | 3/1993 | Thor | |
| 7,640,437 B2 | 12/2009 | Feuser et al. | |
| 2003/0084308 A1* | 5/2003 | Van Rijnswou | 713/189 |
| 2005/0021986 A1 | 1/2005 | Graunke et al. | |
| 2007/0140482 A1 | 6/2007 | Ploog et al. | |
| 2010/0115286 A1* | 5/2010 | Hawkes et al. | 713/189 |
| 2010/0146303 A1* | 6/2010 | Kothari et al. | 713/193 |
| 2010/0299538 A1* | 11/2010 | Miller | 713/190 |

* cited by examiner

*Primary Examiner* — Jeffrey Pwu
*Assistant Examiner* — Thong Truong
(74) *Attorney, Agent, or Firm* — Fish & Richardson P.C.

(57) ABSTRACT

Various systems and methods for encrypting data are disclosed. In one aspect, the method includes receiving a memory address and a value to be written in the memory address. The method also includes encrypting the value using the memory address as an initial value for an encryption process. The method also includes storing the encrypted value in the memory address.

30 Claims, 7 Drawing Sheets

ENCRYPTED MEMORY ACCESS

TECHNICAL FIELD

This disclosure relates generally to electronics, and more particularly to encrypted memories.

BACKGROUND

An increasing number of devices include digital memories. For example, smart phones, cell phones, set top boxes, Global Positioning System (GPS) receivers, point of sale systems and computers use digital memories. These devices can store various personal data or other sensitive information. As a result, there is a growing need to protect the information stored in these devices.

One attempt to address security concerns related to the digital memories and/or the devices that include the digital memories is to encrypt the digital memory. Some conventional encryption methods impose data size restrictions or order restrictions. For example, some encryption methods limit memory accesses to a fixed size (e.g., all memory accesses are 128 bit) or require that data be processed in the same order (e.g., data chaining). Other conventional encryption methods can incur large processing overhead which can lower the bandwidth of the memory accesses. One drawback to encrypting digital memory using the conventional techniques is that memory accesses can be random. For example, the order in which memory is accessed can be random and the size of memory being accessed (e.g., byte, word, etc.) can be random.

SUMMARY

An encryption module can receive a memory address and a data value to be written into the memory address. The data value can be encrypted using the memory address as an initial value for an encryption process. The data value can then be stored in the memory at the memory address.

In some implementations, a method comprises: receiving a memory address and a data value, wherein the data value is to be written in the memory address; encrypting the data value using the memory address as an initial value for an encryption process; and storing the encrypted data value in the memory address.

In some implementations, a system includes a processor configured for generating a memory address for a protected memory location. The system also includes an encryption module coupled to the processor and configured for encrypting data using an encryption process that is initialized by at least a portion of the memory address. The system also includes a memory controller coupled to the encryption module for writing the encrypted data to the protected memory location.

In some implementations, a method includes: receiving a memory address and an encrypted value, wherein the encrypted value is read from the memory address; decrypting the encrypted value using the memory address as an initial value for a decryption process; and providing the decrypted value to a processor core.

Particular implementations of the encryption/decryption process provide one or more of the following advantages: 1) encrypting/decrypting memory accesses without data size restrictions; 2) encrypting/decrypting memory accesses without order restrictions; 3) improved bandwidth for encrypted/decrypted memory accesses; and 4) encrypting/decrypting data without requiring an initial value from a user.

The details of one or more disclosed implementations are set forth in the accompanying drawings and the description below. Other features, aspects, and advantages will become apparent from the description, the drawings and the claims.

DETAILED DESCRIPTION

Figure 1:
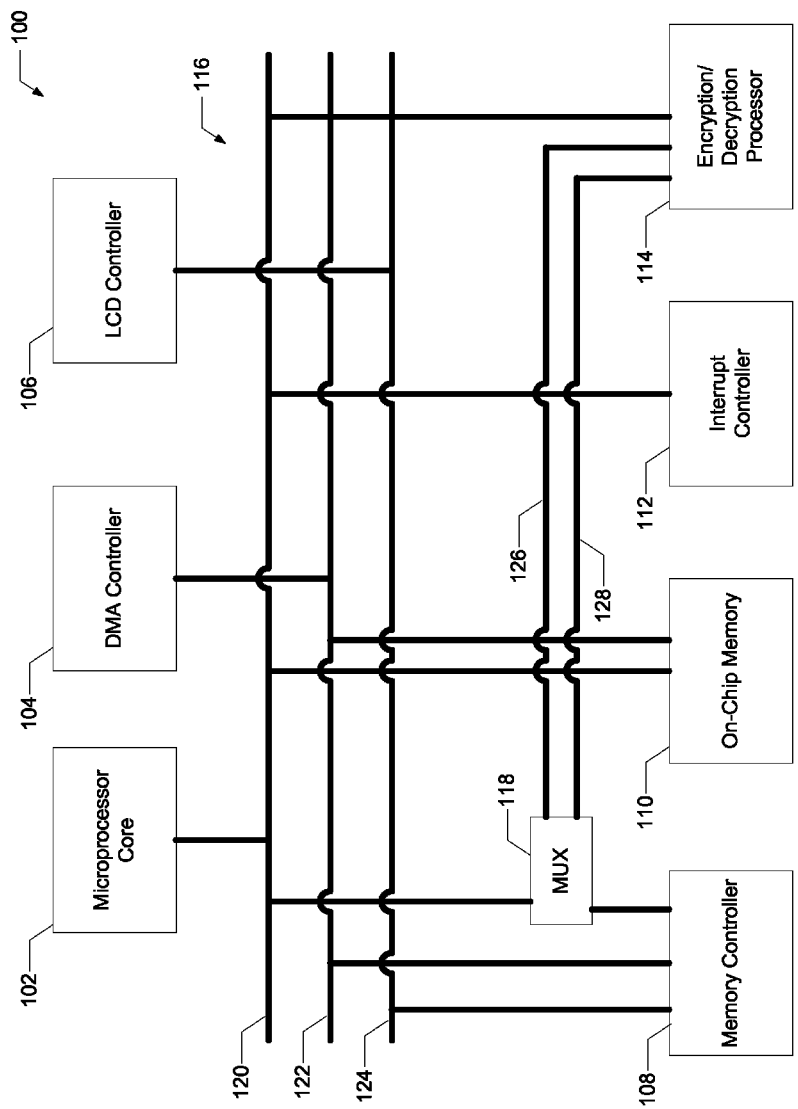
FIG. 1 is a conceptual block diagram of an example system for encrypting/decrypting data.

FIG. 1 is a conceptual block diagram of an example system 100 for encrypting data. The example system 100 can be a microcontroller architecture that includes a microprocessor core 102, a DMA controller 104, a LCD controller 106, a memory controller 108, an on-chip memory 110, an interrupt controller 112, an encryption/decryption processor 114, a system bus matrix 116 and a multiplexer 118.

The microprocessor core 102 can be any appropriate microprocessor core. For example, the microprocessor core can be an ARM-based core or a digital signal processor (DSP) core. The microprocessor core 102 can communicate with external devices via the DMA controller 104 and LCD controller 106. For example, the microprocessor core 102 can control a LCD display via the LCD controller 106 and can read/write data from an external memory device (e.g., an off-chip flash memory device, a frame buffer, a hard drive, a memory mapped port, etc.) via the DMA controller 104.

The microprocessor core 102, the DMA controller 104 and the LCD controller 106 can interact with the external devices via the memory controller 108. For example, the LCD controller 106 can write data into a frame buffer using the memory controller 108, and the DMA controller 104 can read a large block of data from the external memory device using the memory controller 108.

The system bus matrix 116 can connect the microprocessor core 102, the DMA controller 104, the LCD controller 106 and the memory controller 108. For example, the system bus matrix 116 can include MC_bus 120 that connects the microprocessor core 102 to the memory controller via mux 118; DMA_bus 122 that connects the DMA controller to the memory controller 108; and the LCD_bus 124 that connects the LCD controller 106 to the memory controller 108. Each bus in the system bus matrix 116 and/or in the system 100 can be various sizes (e.g., eight bits wide, sixteen bits wide, thirty-two bits wide and sixty-four bits wide). For example, MC_bus 120 and buses 126 and 128 can be thirty-two bits wide. Although the buses are thirty-two bits wide, memory accesses are not limited to thirty-bit memory accesses. For example, assuming the external memory device is thirty-two bit memory (e.g., a word sized memory), the microprocessor core 102 can issue byte (eight bit) read/write operations, half word (sixteen bit) read/write operations and word (thirty-two) bit read/write operations (integer multiple of 8 bits).

As indicated above, the microprocessor core 102 can be connected to the memory controller 108 via the mux 118. For example, the mux 118 can route data from the MC_bus 120 to the encryption/decryption processor 114 via bus 126 and data from the encryption/decryption processor 114 to the memory controller 108 via bus 128.

The encryption/decryption processor 114 can encrypt data to be written into external memory devices by the microprocessor core 102. For example, during a write operation to an external memory device, the microprocessor core 102 transmits the write command to the memory controller 108 via the MC_bus 120 and the mux 118. The write command includes a memory address and a data value to be written into the memory address. The mux 118 can connect the microprocessor core 102 to the encryption/decryption processor 114 via bus 126. The encryption/decryption processor 114 can encrypt the data value using the memory address and can provide the encrypted data value and the memory address to the memory controller 108 via bus 128 and mux 118. Although FIG. 1 does not show the DMA controller 104 or the LCD controller 106 connected to encryption/decryption processor 114 via the mux 118, in some implementations, the system 100 can be arranged such that DMA controller 104 and/or the LCD controller 106 are connected to the encryption/decryption processor 114 via the mux 118. In some implementations, the encryption/decryption processor 114 and/or the LCD controller can include DMA functionality. In these implementations, the encryption/decryption processor 114 can encrypt data to be written into an external memory device by the DMA controller 104 and/or the LCD controller 106.

In addition, the encryption/decryption processor 114 can include a decryption processor (e.g., an encryption/decryption processor) which, in addition to encoding data, can decode encrypted data read from the memory device. For example, the microprocessor core 102 can issue a read operation, which includes a memory address and a data size to be read from the memory address, to the memory controller 108. The mux 118 can connect the memory controller 108 to the decryption processor 114 via bus 128. The encryption/decryption processor 114 can decrypt the encoded data using the memory address and can provide the decrypted data value and to the microcontroller core 102 via bus 126 and mux 118.

Figure 2:
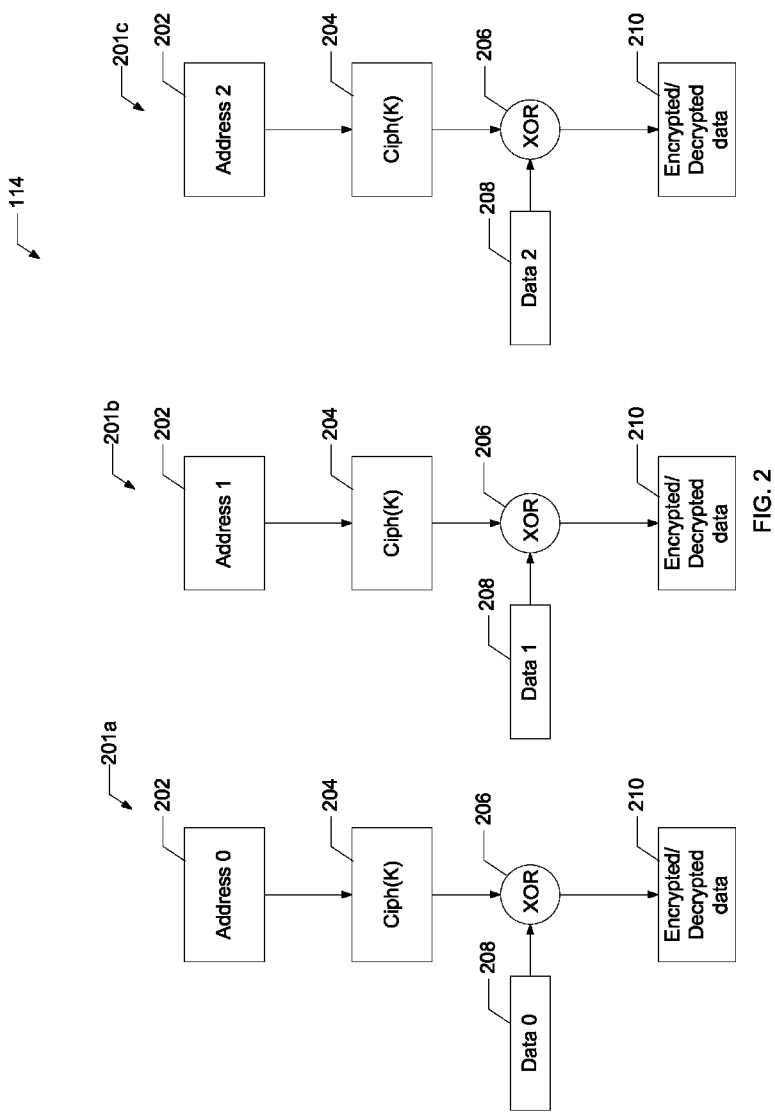
FIG. 2 is a conceptual block diagram of an example encryption/decryption processor.

FIG. 2 is a conceptual block diagram of an example encryption/decryption processor 114. The example encryption/decryption processor 114 includes three encoding/decoding modules 201a, 201b and 201c. Each encoding/decoding module 201a, 201b and 201c includes an address register 202, a cipher module 204, and an XOR operator 206. Although FIG. 2 illustrates three encoding/decoding modules, the encryption/decryption processor 114 can include various numbers of encoding/decoding modules. The address register 202 can be used to store the memory address associated with the write command and/or read command. The address register 202 can be various sizes depending on the architecture of system 100. For example, the address register 202 can be an eight-bit register to correspond with byte-sized memory (e.g., eight-bit memory).

The cipher module 204 can be configured to execute any appropriate cipher process. For example, the cipher module 204 can be configured to execute an Advanced Encryption Standard ("AES") cipher or a Data Encryption Standard ("DES") cipher. The cipher module 204 can access the address register 202 and use the memory address as an initial value or as an initialization vector. For example, the cipher module 204 can use the memory address associated with the write operation as the initial value or initialization vector. The cipher module 204 can be a stream cipher, similar to the counter mode of the AES standard (e.g., AES CTR mode of operation). However, unlike the counter mode of the AES standard, the cipher module 204 does not need a user-provided initial value (e.g., the cipher module 204 can operate without user input providing an initial value) and data does not need to be processed in the same order. The cipher module 204 outputs an encrypted value (e.g., the encrypted memory address).

With respect to a write command, the XOR operator 206 receives the encrypted memory address and the data value associated with the write operation and performs the XOR operation using the encrypted memory address and the data value (e.g., encrypted data value=data value XOR encrypted memory address). The output of the XOR operator 206 (e.g., the encrypted data value 210) is then output. For example, the encrypted data value 210 can be provided to the memory controller 108 via the bus 128 and mux 118.

With respect to a read command, the XOR operator 206 receives the encrypted memory address and the encrypted data value read from the memory address and performs the XOR operation using the encrypted memory address and the encrypted data value (e.g., decrypted data value=encrypted data value XOR encrypted memory address). The output of the XOR operator 206 (e.g., the decrypted data value 210) is then output. For example, the decrypted data value 210 can be provided to the microcontroller core 102 via the bus 126 and mux 118.

Figure 3:
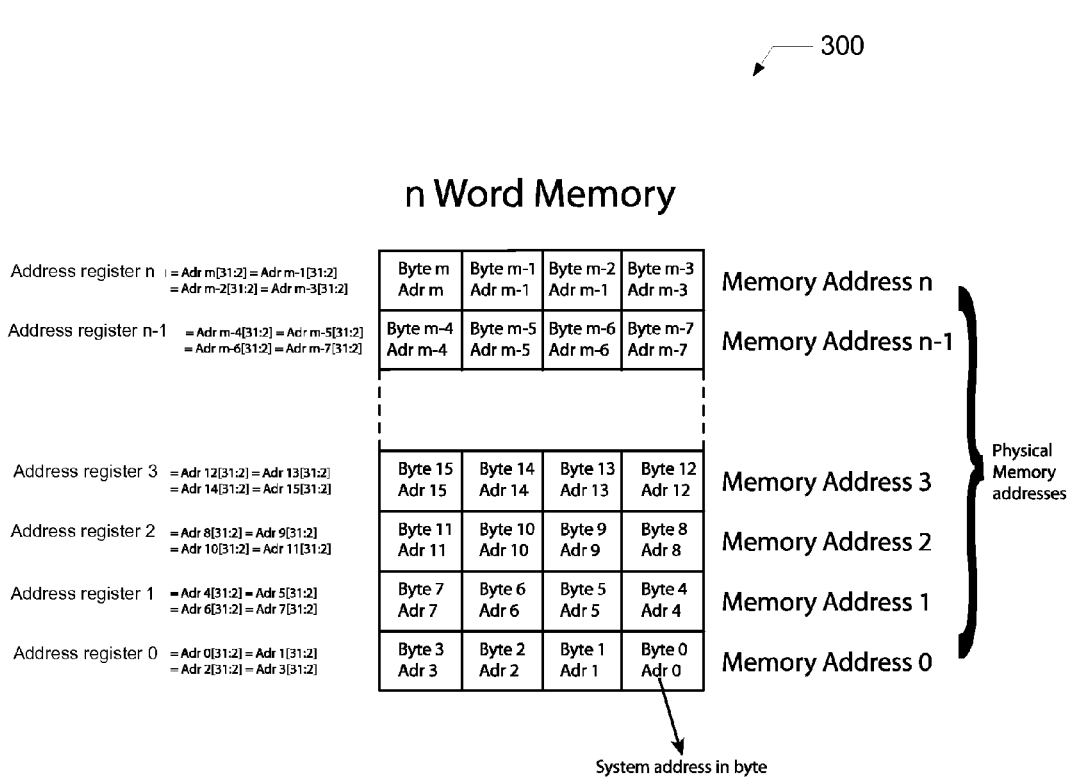
FIG. 3 illustrates an exemplary memory.

In some implementations, the external memory device is a word memory device (e.g., each memory cell includes four bytes of data). For example, FIG. 3 illustrates an n word memory 300 and each memory address includes four bytes of data. For example, memory address 0 includes byte 3-byte 0. Because memory accesses can be random in size (e.g., a single byte can be written or a word of data can be read), the memory address can be truncated before the memory address is stored in the address register 202. For example, if the thirty-two bit memory address is 0xAA10B310, the encoding module 201a can truncate the two least significant bits and store the truncated value (e.g., 0x2A842CC4) in the address register 202. This allows the cipher module 204 to use the same initial value or initialization vector for each byte within the word (e.g., byte 3-byte 0 of memory address 0).

In addition, the n word memory 300 can be accessed using various data sizes. For example, the memory 300 can be accessed using half-word accesses or double word accesses. The number of bits truncated from the memory address can depend on the size of memory access. For example, if the memory 300 is accessed using half-word accesses, the encoding module 201a can truncate the least significant bit and store the truncated value in the address register 202. As an another example, if the memory 300 is accessed using double word accesses, the encoding module 201a can truncate the three least significant bits.

In some implementations, rather than truncating the memory address, the encoding module 201a can write a value into the memory address. For example, the encoding module 201a can write a predetermined value into the two or four least significant bits of the memory address. The predetermined value can be all 0s or all 1s (e.g., four 0s or two 1s). In some implementations, the encoding module 201 can write a value into one or more bits anywhere in the memory address. For example, the encoding module 201a can write a predetermined value in the three most significant bits of the memory address or in bit position of the memory address.

Figure 4A:
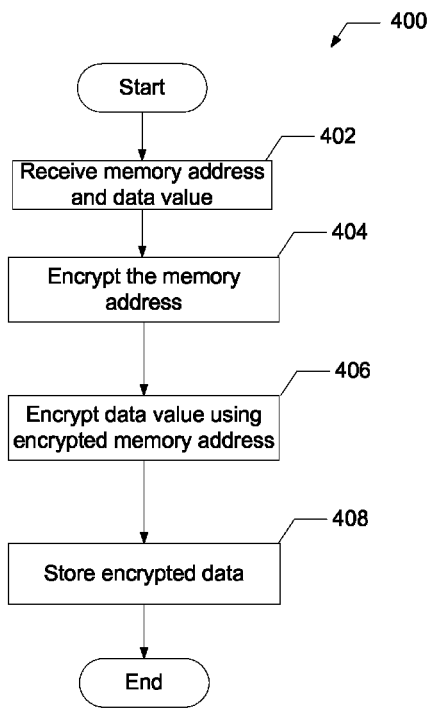
FIG. 4A is a flow diagram of an exemplary process for encrypting data.

FIG. 4A is a flow diagram of an exemplary process 400 for encrypting data. The process 400 begins when a memory command (e.g., a write command) is received (at step 402). For example, the encryption/decryption processor 114 can receive a write operation that includes a memory address and a data value to be written into the memory address and store the memory address in the address register 202. In some implementations having a memory similar to n word memory 300 of FIG. 3, the two least significant bits of the memory address are truncated before the memory address is stored in the address register 202. In some implementations, the least significant bit or the three least significant bits can be truncated based on the size of the memory access. In some implementations, the two or four least significant bits of the memory address are overwritten using a predefined value (e.g., four 1s or four 0s).

Then, the memory address is encoded (at 404). For example, the cipher module 204 can access the memory address stored in the address register 204 and encrypt the memory address. In some implementations, the cipher module 204 encrypts the memory address. The cipher module 204 can encrypt the memory address using various encryption algorithms. For example, the cipher module 204 can encrypt the memory address using the AES encryption algorithm or the DES encryption algorithm. The memory address can be used by the encryption/decryption processor 114 as an initial value or initialization vector.

The data value associated with the write operation is encrypted (at 406). For example, the data value associated with the write operation can be encrypted by the XOR operation using the encrypted memory address (e.g., encrypted data value=data value XOR encrypted memory address).

The encrypted data value 210 can be stored in memory (at 408). For example, encryption/decryption processor 114 can provide the encrypted data value 210 to the memory controller 108, which can store the encrypted data value in the memory device (e.g., write the encrypted data value at the memory address associated with the write operation).

Figure 4B:
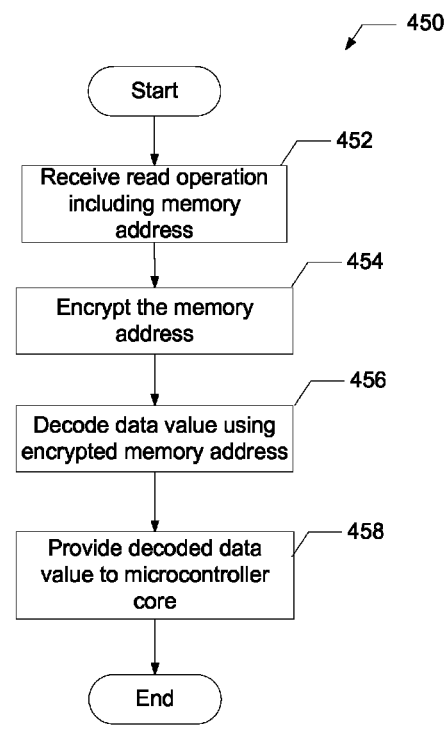
FIG. 4B is a flow diagram of an exemplary process for decrypting data.

FIG. 4B is a flow diagram of an exemplary process 450 for decrypting data. The process 450 begins when a memory command (e.g., a read command) is received (at step 452). For example, the encryption/decryption processor 114 can receive a read command that includes a memory address and a data size to be read from the memory address. The memory address can be stored in the address register 202. In some implementations having a memory similar to the n word memory 300 of FIG. 3, the two least significant bits of the memory address are truncated before the memory address is stored in the address register 202. In some implementations, the two or four least significant bits of the memory address are overwritten using a predefined value (e.g., four 1s or four 0s).

Then, the memory address is encoded (e.g., ciphered or encrypted) (at 454). For example, the cipher module 204 can access the memory address stored in the address register 202 and encrypt the memory address. The cipher module 204 can encrypt the memory address using various encryption algorithms. For example, the cipher module 204 can use the AES encryption algorithm or the DES encryption algorithm. The memory address can be used by the encryption/decryption processor 114 as an initial value or initialization vector.

A data value stored at the memory address associated with the read operation is decrypted (at 456). For example, the encrypted data value stored in the memory address can be decrypted by the XOR operation using the encrypted memory address (e.g., decrypted data value=encrypted data value XOR encrypted memory address).

The decrypted data value 210 can be provided to the microcontroller core (at 458). For example, encryption/decryption processor 114 can provide the decrypted data value 210 to the microcontroller core 102, which can use the decrypted data value in a computation, or other operation. In some implementations, the microcontroller core 102 can provide the decrypted data value to another component in the system 100.

In some implementations, the microprocessor core 102 can access consecutive memory addresses (e.g., a burst access). For example, the microprocessor core 102 can access four consecutive words of memory (e.g., read four consecutive words of data from memory or write four consecutive words of data to memory). To take advantage of the four consecutive memory accesses, the encryption/decryption processor 114 can truncate the four least significant bits of the memory address. The truncated memory address can be used as the initial value for the cipher module 204. This can improve the bandwidth of a data transfer because the memory address is processed by the cipher module 204 once for the four words.

Figure 5A:
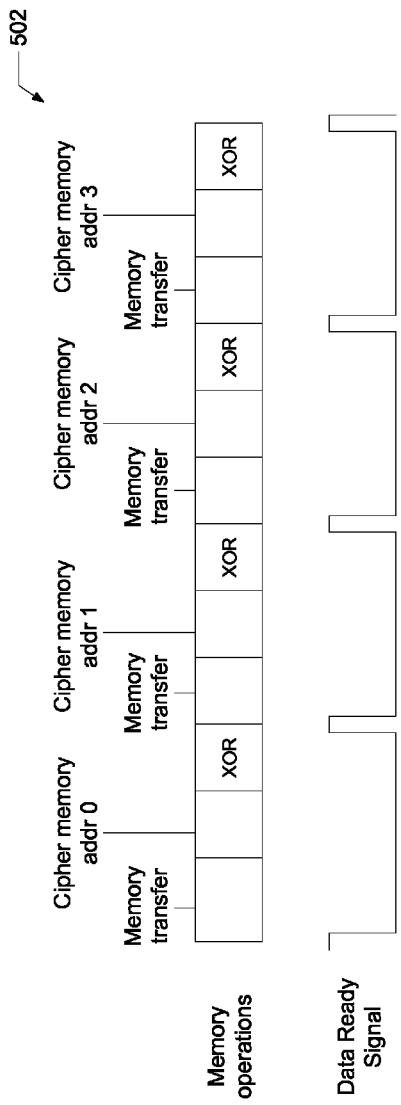
FIGS. 5A-5B are example timing diagrams.
Figure 5B:
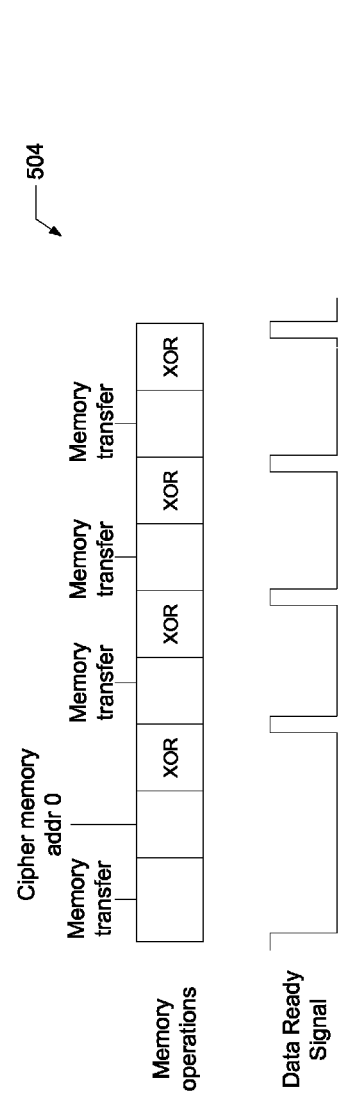

For example, FIGS. 5A and 5B illustrate example timing diagrams 502 and 504. Timing diagram 502 illustrates four consecutive memory accesses where the four least significant bits of the memory addresses are not truncated before being processed by the cipher module 204 (e.g., the encryption/decryption processor 114 truncates the two least significant bits as described above and in connection with FIG. 3). Each memory access includes a memory transfer operation (e.g., a read operation that includes a memory address and an encrypted data value to read from the memory address), a cipher operation (e.g., ciphering the memory address) and an XOR operation (e.g., applying the XOR operator to the encoded data value).

Timing diagram 504 illustrates four consecutive memory accesses, where the four least significant bits of the memory address are truncated before being processed by the cipher module 204. Because the four least significant bits of the memory address are truncated, the memory address does not need to be processed by the cipher module 204 for each memory access. Instead, the memory address is ciphered by the cipher module 204 one time and the ciphered address is used to XOR the remaining data values. As illustrated in FIGS. 5A and 5B, this can yield improved data transfer bandwidth because the time to encode the four consecutive memory addresses is reduced.

Figure 6:
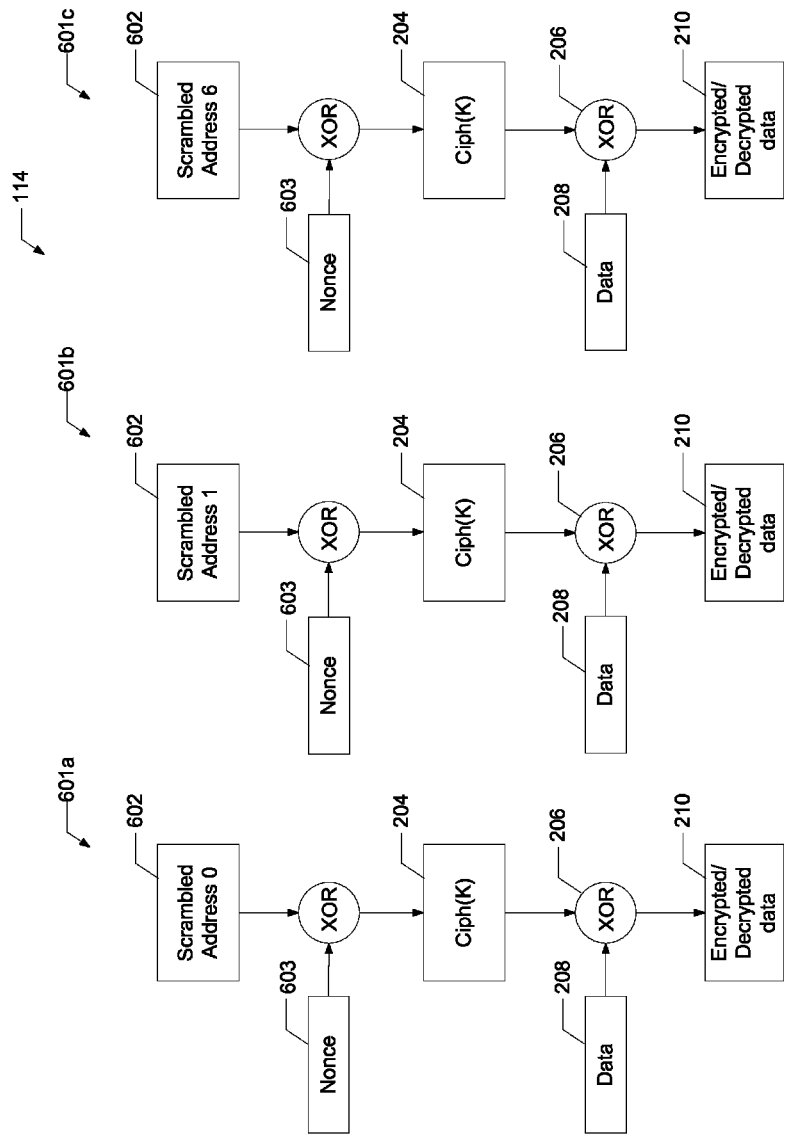
FIG. 6 is a conceptual block diagram of an example encryption/decryption processor.

In some implementations, the encryption/decryption processor 114 can include additional security measures. For example, FIG. 6 illustrates an implementation of the encryption/decryption processor 114 that includes a three encoding/decoding modules 601a, 601b and 601c. The encoding/decoding modules 601a-c are similar to the encoding/decoding modules 201a-c but can include a scrambled address register 602 and a nonce 603. The encoding module 601 can receive a scramble the memory address and store the scrambled memory address in the scrambled address register 602. In some implementations, the memory address can be scrambled by the microprocessor core 102 or can be scrambled by a dedicated peripheral. In some implementations, the memory address is truncated (e.g., the two least significant bits are truncated) before being scrambled and stored in the scrambled address register 602.

The scrambled address register 602 is encoded using a random or pseudo-random number (e.g., a nonce 603). For example, the scrambled address and the nonce 603 can be combined via an XOR operator (e.g., encoded address=scrambled address XOR nonce) and the encoded address can be provided to the cipher module 204. The encoded address and the data value can be processed as explained above in connection with FIGS. 2 and 4.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A computer-implemented method comprising:
receiving a burst access request including a memory address and a plurality of values to be written at a plurality of consecutive memory addresses in a memory, one for each value, starting from the memory address;
truncating the memory address by truncating a number of the least significant bits of the memory address, the number of least significant bits being equal to the number of consecutive memory addresses;
encrypting each value using the truncated memory address as an initial value for an encryption process; and
storing the encrypted values in the memory at the consecutive memory addresses starting from the memory address.

2. The computer-implemented method of claim 1, wherein truncating the memory address includes:
storing a predefined value in four least significant bits of the memory address, wherein the predefined value comprises a value of four 0s or four 1s.

3. The computer-implemented method of claim 1, wherein truncating the memory address includes:
storing a predefined value in one or more bits of the memory address.

4. The computer-implemented method of claim 1 wherein the encryption process is based on an Advanced Encryption Standard or a Data Encryption Standard.

5. The computer-implemented method of claim 1 wherein encrypting comprises:
encrypting the memory address; and
encrypting each value using the encrypted memory address.

6. The computer-implemented method of claim 5 wherein encrypting each value using the encrypted memory address value comprises an XOR operation.

7. The computer-implemented method of claim 1 wherein the memory address is associated with a write command.

8. The computer-implemented method of claim 7 wherein the memory address is not directly provided by a user.

9. The computer-implemented method of claim 1 further comprising:
scrambling the memory address prior to encrypting the values; and
encrypting the scrambled memory address using a pseudo random value.

10. The computer-implemented method of claim 9 wherein encrypting the scrambled memory address comprises an XOR operation.

11. A system comprising:
a processor configured for generating a burst access request including a memory address for a protected memory location and a plurality of values to be written at a plurality of consecutive memory addresses, one for each value, starting from the memory address;
an encryption module coupled to the processor and configured for encrypting each of the values using an encryption process that is initialized by a truncated memory address truncated by a number of the least significant bits of the memory address, the number of least significant bits being equal to the number of consecutive memory addresses; and
a memory controller coupled to the encryption module for writing the encrypted values to the consecutive memory addresses starting from the memory address.

12. The system of claim 11 wherein the encryption module is further configured to store a predefined value in four least significant bits of the memory address, wherein the predefined value comprises a value of four 0s or four 1s.

13. The system of claim 11 wherein the encryption module is further configured to store a predefined value in one or more bits of the memory address.

14. The system of claim 11 wherein the encryption process is based on an Advanced Encryption Standard or a Data Encryption Standard.

15. The system of claim 11 wherein encrypting the values comprises:
encrypting the at least a portion of the memory address; and
encrypting the data using the encrypted memory address.

16. The system of claim 15 wherein encrypting the data using the encrypted memory address comprises an XOR operation.

17. The system of claim 11 wherein the memory address is associated with a write command.

18. The system of claim 17 wherein the memory address is not directly provided by a user.

19. The system of claim 11 wherein the encryption module is further configured to:
scramble the memory address prior to initializing the encryption process; and
encrypt the scrambled memory address using a pseudo random value.

20. The system of claim 19 wherein encrypting the scrambled memory comprises an XOR operation.

21. The system of claim 11 wherein the protected memory location comprises a memory location configured to store encrypted data.

22. A computer-implemented method comprising:
receiving a burst access request including a memory address and a plurality of encrypted values, wherein the encrypted values are read from a plurality of consecutive memory addresses of a memory, one for each value, starting from the memory address;
truncating the memory address by truncating a number of the least significant bits of the memory address, the number of least significant bits being equal to the number of consecutive memory addresses;
decrypting each encrypted value using the truncated memory address as an initial value for a decryption process; and
providing the decrypted values to a processor.

23. The computer-implemented method of claim 22 further comprising:
storing a predefined value in four least significant bits of the memory address, wherein the predefined value comprises a value of four 0s or four 1s.

24. The computer-implemented method of claim 22 further comprising:
storing a predefined value in one or more bits of the memory address.

25. The computer-implemented method of claim 22 wherein the decryption process is based on an Advanced Encryption Standard or a Data Encryption Standard.

26. The computer-implemented method of claim 22 wherein decrypting comprises:
- encrypting the memory address; and
- decrypting the encrypted values using the encrypted memory address.

27. The computer-implemented method of claim 26 wherein decrypting the encrypted values using the encrypted memory address comprises an XOR operation.

28. The computer-implemented method of claim 22 wherein the memory address is associated with a read command.

29. The computer-implemented method of claim 28 wherein the memory address is not directly provided by a user.

30. The computer-implemented method of claim 22 further comprising:
- scrambling the memory address prior to encrypting the value; and
- encrypting the scrambled memory address using a pseudo random value.

\* \* \* \* \*